(12) United States Patent
Furtner

(10) Patent No.: US 10,114,401 B2
(45) Date of Patent: Oct. 30, 2018

(54) SYSTEM AND METHOD FOR A SERIAL BUS INTERFACE

(71) Applicant: Infineon Technologies AG, Neubiberg (DE)

(72) Inventor: Wolfgang Furtner, Fuerstenfeldbruck (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 999 days.

(21) Appl. No.: 14/083,037

(22) Filed: Nov. 18, 2013

(65) Prior Publication Data

US 2015/0137789 A1    May 21, 2015

(51) Int. Cl.
*G05F 5/00* (2006.01)
*G06F 1/26* (2006.01)
*G06F 3/038* (2013.01)

(52) U.S. Cl.
CPC ........... *G05F 5/00* (2013.01); *G06F 1/26* (2013.01); *G06F 1/266* (2013.01); *G06F 3/038* (2013.01)

(58) Field of Classification Search
CPC ... G05F 5/00; G06F 3/038; G06F 1/26; G06F 1/266
See application file for complete search history.

(56) References Cited

U.S. PATENT DOCUMENTS

| 7,636,806 | B2 | 12/2009 | Furtner | |
| 8,237,414 | B1* | 8/2012 | Li | H02J 7/0003 320/103 |
| 2005/0174094 | A1 | 8/2005 | Purdy et al. | |
| 2010/0219790 | A1 | 9/2010 | Chadbourne et al. | |
| 2011/0057604 | A1* | 3/2011 | Capella | H02J 7/0004 320/107 |
| 2011/0208980 | A1* | 8/2011 | Brooks | G06F 1/266 713/300 |
| 2012/0030381 | A1* | 2/2012 | Singh | G06F 1/3206 710/16 |
| 2013/0049675 | A1* | 2/2013 | Minami | H02J 7/0054 320/103 |
| 2013/0082644 | A1 | 4/2013 | Gagne et al. | |

(Continued)

FOREIGN PATENT DOCUMENTS

| CN | 1914582 A | 2/2007 |
| CN | 101398459 A | 4/2009 |

(Continued)

OTHER PUBLICATIONS

"Battery Charging Specification," USB Implementers Forum, Inc., Dec. 7, 2010, 71 pages, revision 1.2.

(Continued)

*Primary Examiner* — Nimesh G Patel
(74) *Attorney, Agent, or Firm* — Slater Matsil, LLP

(57) ABSTRACT

In accordance with an embodiment, a method of operating a charging port having a power connection and a first data connection includes determining whether a compatible device is coupled to the charging port and receiving a serial data stream from the compatible device via the first data connection. The serial data stream includes a plurality of symbols representing a request for a power supply voltage and/or current, and the method further includes applying the requested power supply voltage and/or current to the power connection.

31 Claims, 7 Drawing Sheets

(56) References Cited

U.S. PATENT DOCUMENTS

| | | | |
|---|---|---|---|
| 2013/0165046 A1* | 6/2013 | Tang | H04B 7/00 |
| | | | 455/41.2 |
| 2013/0234668 A1* | 9/2013 | Kuo | H02J 7/0052 |
| | | | 320/125 |
| 2013/0290765 A1 | 10/2013 | Waters et al. | |
| 2013/0326094 A1 | 12/2013 | Yu et al. | |
| 2014/0103864 A1 | 4/2014 | Song | |
| 2014/0111030 A1* | 4/2014 | Chou | G05F 1/10 |
| | | | 307/130 |
| 2014/0208134 A1* | 7/2014 | Waters | G06F 13/385 |
| | | | 713/310 |
| 2014/0335919 A1* | 11/2014 | Stewart | H02J 7/0042 |
| | | | 455/573 |
| 2015/0035476 A1* | 2/2015 | Frid | H02J 7/0021 |
| | | | 320/107 |
| 2015/0046726 A1* | 2/2015 | Yokoyama | G06F 1/266 |
| | | | 713/300 |
| 2015/0160674 A1* | 6/2015 | Burdette | G05F 1/66 |
| | | | 700/295 |
| 2015/0256018 A1 | 9/2015 | Wei et al. | |
| 2015/0378409 A1* | 12/2015 | Dunstan | G06F 1/266 |
| | | | 713/310 |
| 2016/0141822 A1* | 5/2016 | Hijazi | H01R 43/205 |
| | | | 361/679.31 |
| 2016/0239063 A1* | 8/2016 | Waters | G06F 1/266 |

FOREIGN PATENT DOCUMENTS

| | | |
|---|---|---|
| CN | 102388520 A | 3/2012 |
| CN | 102439816 A | 5/2012 |
| CN | 102479133 A | 5/2012 |
| CN | 102799554 A | 11/2012 |
| CN | 102868820 A | 1/2013 |
| CN | 103033698 A | 4/2013 |

OTHER PUBLICATIONS

CHY100 ChiPhy Family, "Charger Interface Physical Layer IC," Power Integrations, Jul. 2013, 6 pages.

Applications Engineering Department, "24 W HVDCP Quick Charge 2.0 Compatible High Efficiency CV/CC Adaptor Using TOPSwitch—JX TOP268VG and ChiPhy CHY100D," Power Integrations, Oct. 8, 2013, 72 pages.

Polonsky, M., "USB battery charging: it's harder than it looks," EE Times, Mar. 11, 2012, 4 pages.

Taranovich, S. "Power Integrations teams with Qualcomm on rapid-charging technology for mobile devices," UMB Tech., Aug. 1, 2013, 4 pages.

"USB Power Delivery Specification 1.0," USB-IF, Jul. 16, 2012, 11 pages.

* cited by examiner

SYSTEM AND METHOD FOR A SERIAL BUS INTERFACE

TECHNICAL FIELD

The present disclosure relates generally to an electronic device, and more particularly to a system and method for a serial bus interface.

BACKGROUND

As portable electronic devices, such as mobile phones and tablets, are getting more computationally powerful and complex, they are also consuming more power. To accommodate these increased power demands, the energy storage capacity of the batteries used to power such devices are often correspondingly increased.

In many portable products, the Universal Serial Bus (USB) is often used both as communication port and as a power delivery port to accommodate battery charging. For example, a standard USB 2.0 compliant port may provide a maximum power delivery of 7.5 W (5V at 1.5 A) to a dedicated charging port that may be used to recharge the battery of a portable device. However, as the battery capacities of tablets devices are increasing, for example, from 5600 mAh to 8000 mAh and 10000 mAh, the charging time for these devices increase accordingly. For example, using a standard USB 2.0 compliant port, it takes about 2 hours and 40 minutes to recharge a 5600 mAh battery, but it takes 4 hours and 45 minutes to recharge a 10000 mAh.

By increasing the charging current or charging voltage, however, faster charging times may be achieved. In some cases, a "Y" connector may be used to combine the output of two USB ports to provide higher currents, or some non-standard USB-type implementations may allow for higher currents.

SUMMARY OF THE INVENTION

In accordance with an embodiment, a method of operating a charging port having a power connection and a first data connection includes determining whether a compatible device is coupled to the charging port and receiving a serial data stream from the compatible device via the first data connection. The serial data stream includes a plurality of symbols representing a request for a power supply voltage and/or current, and the method further includes applying the requested power supply voltage and/or current to the power connection.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a serial bus interface that may be used for communication between a USB charging port and a portable device. The invention may also be applied to other systems and applications including other circuits that perform serial communication and/or provide power to electronic devices.

In an embodiment, a charging system includes a dedicated charging port that is configured to provide power to a device connected via a USB cable. After a detection operation, the charging system engages in serial two-way communication with the connected device. During this two-way communication, various parameters may be exchanged between the charger and the connected device on at least one of the D+ and D− lines of the USB cable by using dedicated voltage levels defined as high and low states. For example, the connected device may indicate a requested charging voltage for the dedicated charging port to provide to the connected device. In such a case, the dedicated charging port may adjust an output voltage of a power supply circuit that provides charge to the connected device.

Figure 1A:
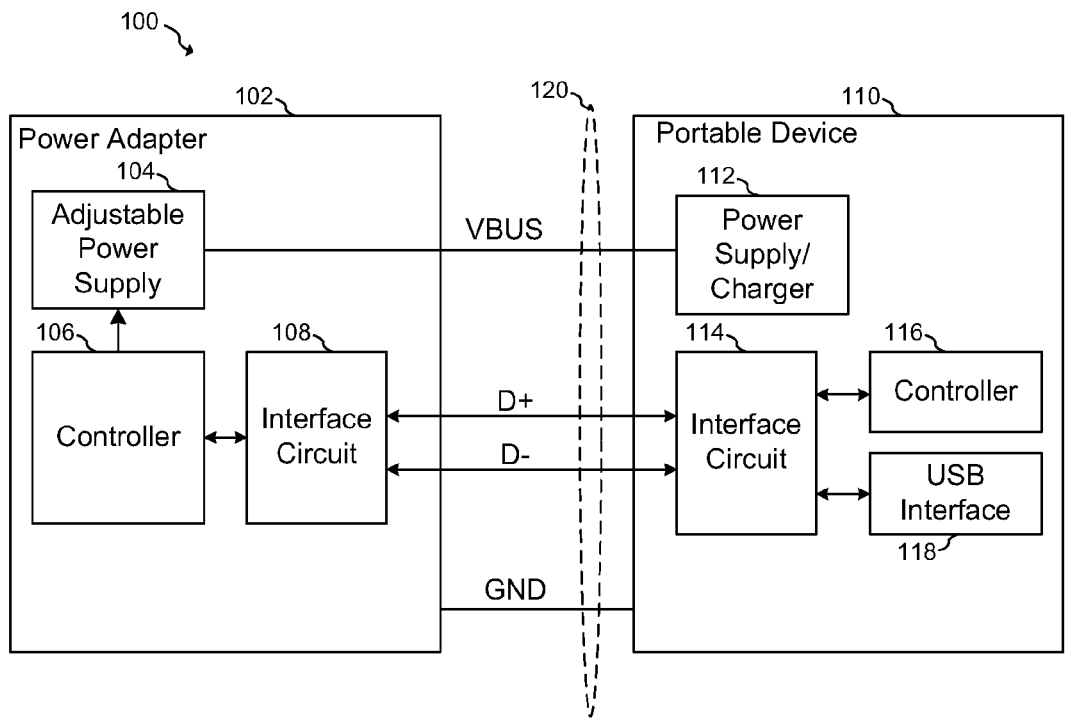
FIGS. 1a-b illustrates an embodiment charging system and a corresponding waveform diagram.

FIG. 1a illustrates the power system 100 according to an embodiment of the present invention. Our system 100 includes power adapter 102 that is coupled to portable device 110 via USB connection 120. It should be understood that in some embodiments, portable device 110 may represent any device that is coupled to power adapter 102 via a USB cable. As shown, the USB connection 120 includes for signal lines, namely, power supply connection VBUS, the ground connection GND, and data lines D+ and D−. In alternative embodiments, other power and data connections may be used instead of USB connection 120.

Power adapter 102 includes adjustable power supply 104 that provides power to the power supply connection VBUS. In embodiments of the present invention, the amount of power provided to portable device 110 may be adjusted by changing the output voltage of the adjustable power supply 104. For example, the voltage of the power supply connection VBUS may be adjusted between about 5 V and about 20 V in various numbers of steps. Alternatively, voltages outside of this range may be used depending on the particular embodiment and its specifications.

Power adapter 102 also includes interface circuit 108 coupled to data lines D+ and D−. In an embodiment, interface circuit 108 includes a transmitter and receiver configured to engage in two-way serial communication between power adapter 102 and portable device 110. Controller 106 operates interface circuit 108 and provides control to adjustable power supply 104.

Portable device 110 includes power supply/charger 112 that receives power from adjustable power supply 104 within power adapter 102. Depending on the particular implementation of portable device 110, power supply/charger 112 may operate at various voltages of power connection VBUS. For example, during a normal operation mode, power supply/charger 112 may provide sufficient power to portable device 110 when power connection VBUS is set to about 5 V. On the other hand, during a charging operation, or during a fast charging operation, power supply/charger 112 may be able to more quickly charge a battery (not shown) coupled to portable device 110 when power connection VBUS is set to a higher voltage, such as 12 V or 20 V. In an embodiment, portable device 110 may signal the power adapter 102 a requested power supply voltage for power connection VBUS. This signaling, for example, may occur via interface circuit 114 that includes a transmitter and a receiver capable of performing serial communication with power adapter 102, and provides a way for portable device 110 to indicate to power adapter 100 that portable device 110 is able to operate at a higher voltage than the standard 5 V USB power voltage. Controller 116 operates interface circuit 114, and USB interface 118 is coupled to data pins D+ and D− via interface circuit 114. In some embodiments, communication between power adapter 102 and portable device 110 are not performed using high speed circuitry of a standard USB interface, thereby allowing for bi-directional communication using a simpler physical interface.

Figure 1B:
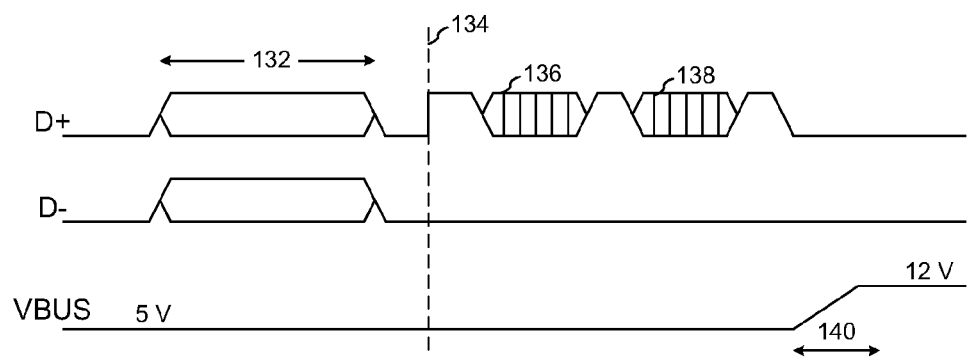

FIG. 1b shows a waveform diagram that illustrates the operation of USB interface 120 when system 100 is initialized. During time period 132, a detection operation is performed between power adapter 102 and portable device 110. This detection operation may be used to establish that power adapter 102 and portable device 110 are each capable of embodiment serial communication operations. In an embodiment, the detection operation is performed using data pins D+ and D−. Once it has been established that power adapter 102 and portable device 110 are capable of serial communication, serial communication between the two devices commences. In the illustrated example, serial data 136 is transmitted from portable device 110 and received by power adapter 102. Serial data 138, on the other hand represents communication from power adapter 102 and portable device 110. In one embodiment, voltage levels on data line D+ are established by coupling data line D+ to a pullup voltage via a pullup resistance. As shown in the waveform diagram of FIG. 1B, the pull-up voltage is coupled to data line D+ at time 134. In an embodiment, data is transmitted on data line D+ in a pseudo-differential manner using data line D− as a reference. By using D− as a signaling reference instead of ground connection GND that carries power supply current and ground noise, quieter operation may be achieved in some embodiments. Alternatively, data may be transmitted on data line D+ or D− and referenced to GND.

In an embodiment, power adapter may initially provide a 5 V power supply voltage at VBUS, which is the standard power supply voltage for USB devices. In the illustrated example, however, serial data 136 includes a request for a higher power supply voltage. As shown, the voltage of power supply connection VBUS increases from 5V to 12V during time period 140 after receipt of serial data 136.

Figure 2:
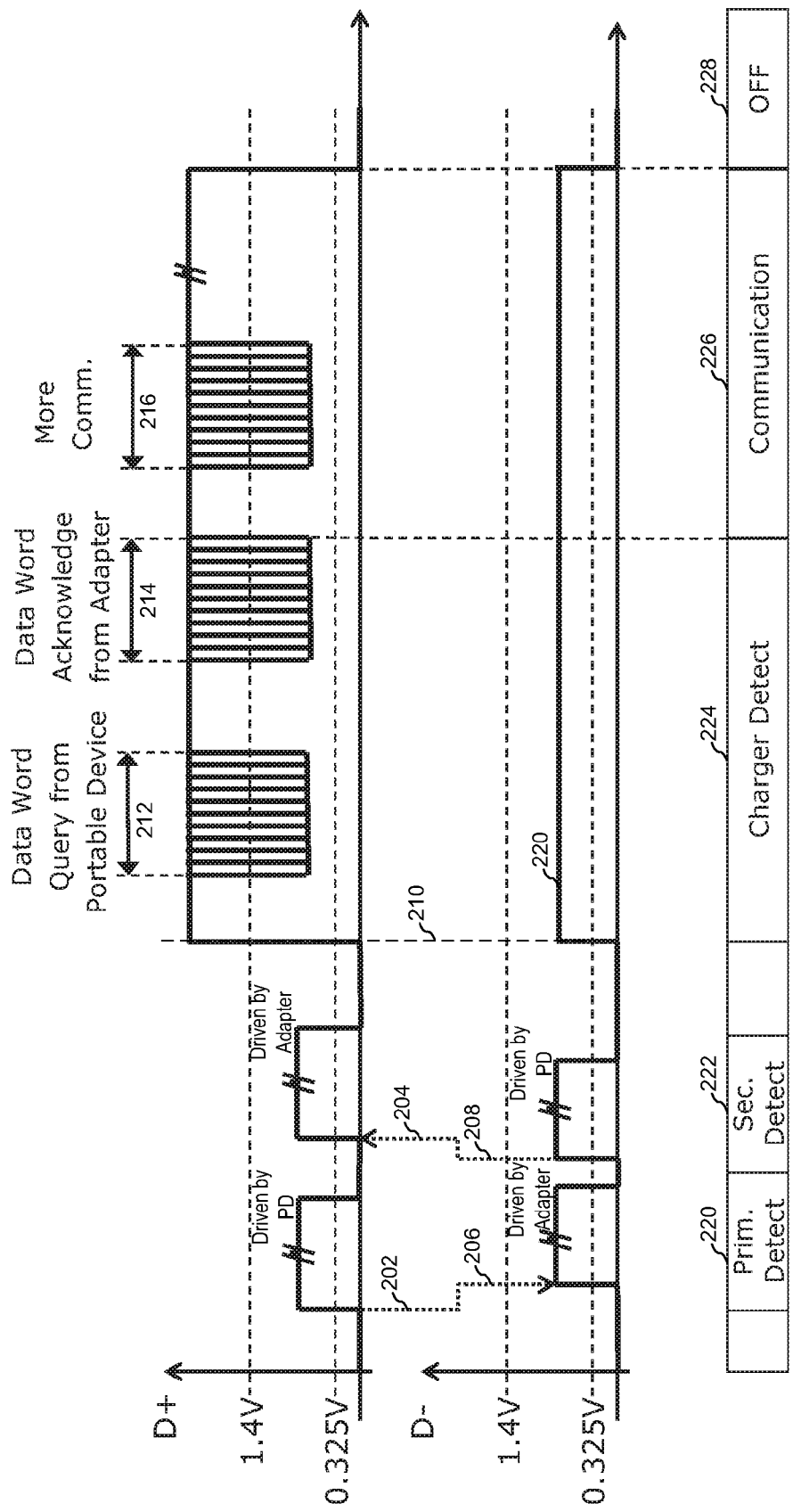
FIG. 2 illustrates a waveform diagram showing the operation of an embodiment system.

FIG. 2 illustrates a waveform diagram of an embodiment detection and bi-directional communication sequence between adapter 102 and portable device (PD) 110 that provides compatibility with revision 1.2 of the USB Battery Charging Specification (USB BC 1.2) that is incorporated herein by reference in its entirety. The USB BC 1.2 Specification defines a procedure in which a portable device (PD) can determine whether it is connected to a Standard Downstream Port (SDP) that complies with the USB 2.0 definition of a host or hub, a Charging Downstream Port (CDP) that complies with the USB 2.0 definition of a host or hub that has extra power supply functionality, or a Dedicated Charging Port (DCP) that outputs power through a USB connector, but does not enumerate a downstream device. This detection procedure is divided into a Primary Detection phase that distinguishes an SDP from other device types, and a Secondary Detection phase that distinguishes the DCP from the CDP.

For example, a USB BC 1.2 compliant portable device (PD) applies a voltage level of $V_{DP\_SRC} \cong 0.6V$ on D+ during Primary Detection and on D− during Secondary Detection. Moreover it compares D− to a voltage level of $V_{DAT\_REF} \cong 0.325V$ during Primary Detection and D+ during Secondary Detection. Optionally it compares D− to a voltage level of $V_{LGC} \cong 1.4V$ during Primary Detection and D+ during Secondary Detection.

In an embodiment of the present invention, device detection commences with the Primary and Secondary Detection of USB BC 1.2, and then continues with a detection sequence that determines whether the connected devices are capable of performing embodiment two-directional serial communication. As shown in FIG. 2, Primary Detection phase 220 begins when the PD asserts a voltage between about 0.325 V and about 1.4 V, for example 0.6 V on data line D+ at time 202. If the PD detects that the Adapter provides a voltage higher than about 0.325 V on data line D− at time 206, the PD determines that the device to which it is connected is not an SDP. Next, in Secondary Detection phase 222, the PD asserts a voltage higher than about 0.325 V, for example 0.6 V, on data line D− at time 208. If the PD detects that the Adapter provides a voltage higher than about 0.325 V, on data line D+ at time 204, the PD determines that the device to which it is connected is not a CDP, thereby indicating that the device may be a DCP or an embodiment charging device.

Next, during charger detection phase, at time 210, the PD asserts a voltage greater than 1.4 V, for example 3.3 V on data line D+, and asserts a voltage of below about 1.4 V, for example 0.6 V on data line D−. The PD transmits a query 212 and the adapter provides a response 214 to query 212. The query may include for example identification data, interface version number and/or voltage and current requirements of the PD and answer may include, for example identification data, interface version number and/or voltage and current capabilities of the Adapter. Once the PD receives response 214 from the adapter, charger detection phase 224 ends and more communication 216 may now occur, either from the adapter to the PD, or from the PD to the adapter. Once communication is finished, pins D+ and D− are brought low in off phase 228. It should be understood, however, that in alternative embodiments, other detection methods may be used depending on the particular application and its specifications.

Figure 3A:
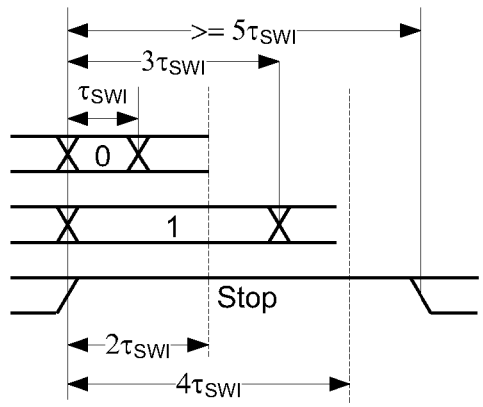
FIGS. 3a-b illustrate a waveform diagram depicting a serial data transmission method and an example serial data transmission word.
Figure 3B:
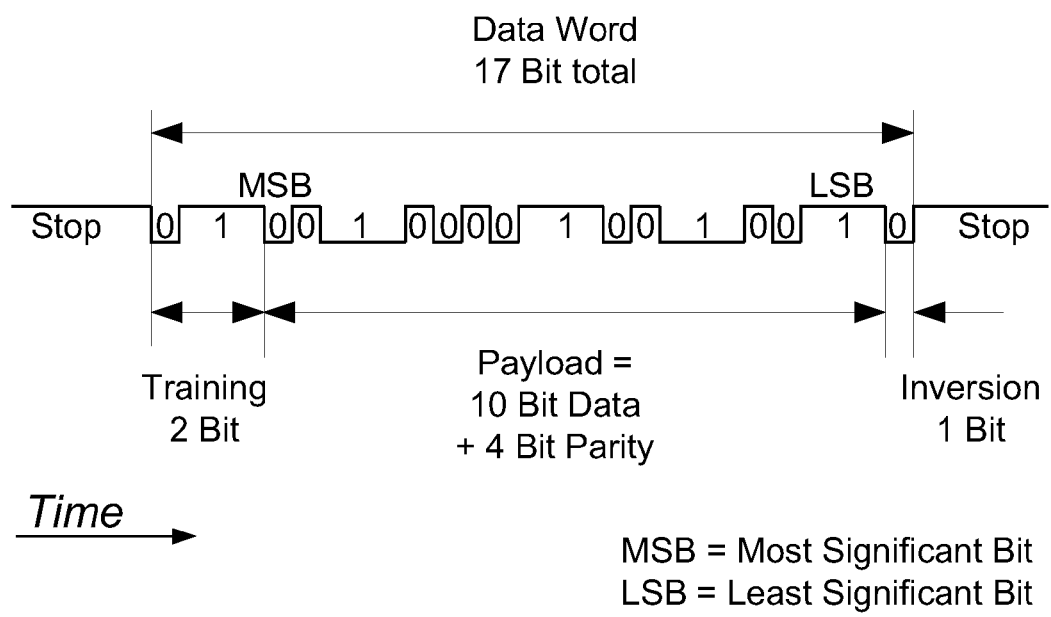

FIG. 3a illustrates a waveform diagram, and FIG. 3b illustrates a data word of a time-distance modulation signaling method that may be used to implement the bidirectional serial signaling in embodiments of the present invention. This method is described in U.S. Pat. No. 7,636,806 entitled "Electronic System and Method for Sending or Receiving a Signal" issued on Dec. 22, 2009, which application is incorporated herein by reference in its entirety. As shown in FIG. 3a, serial data is encoded by modulating the time between signal changes from high to low (falling edge) and from low to high (rising edge) level and vice versa. Data is encoded between subsequent toggles of the signal. A short duration $\tau_{SWT}$ between edges designates a binary zero, a longer duration $3\tau_{SWT}$ designates a binary one and an even longer duration $>5\tau_{SWT}$ encodes a stop signal. It should be understood that in alternative embodiments, different time periods besides $\tau_{SWT}$, $3\tau_{SWT}$ and $>5\tau_{SWT}$ may be used to encode data.

FIG. 3b illustrates an example data word made up of the three codes described with respect to FIG. 3a. As shown, the stop symbol is used to separate data words. Within the data word, 17 bits of information are encoded with 18 signal toggles (9 falling edges and 9 rising edges). The data word contains a training sequence to establish the bit timing of the word, and it parity information to protect the data integrity. Additionally, an inversion bit is used to shorten the transmission in case data words contain too many binary ones. In alternative embodiments, the data work may include greater or fewer than 17 bits. It should be further appreciated that the coding method illustrated in FIG. 3a-b are just one example of many possible coding methods that may be used in embodiments of the present invention.

In embodiments, bi-directional serial communication between the power adapter and the portable device may be used to perform a number of different functions. For example, data may be used to provide identification of the adapter including model, manufacturer, and other parameters. Exchanged data may also be used to provide cryptographic authentication of the adapter, using, for example, a challenge and response algorithm. Embodiment serial interfaces may also be used to allow the portable device to query adapter capabilities, and to provide extended output voltage control. For example, the portable device can request a particular power supply voltage. Such voltages may range from low voltages to greater than 20 V, and arbitrary voltages may be addressable. In addition, embodiment serial interfaces may be used to negotiate the maximum charging current between the adapter and the portable device.

In some embodiments, serial communication may be used to communicate sensor states in the adapter and/or in the portable device. For example, the adapter may have a temperature sensor whose readings are available to the portable device via the serial communication. In addition to temperature data, other telemetry of adapter parameters including but not limited to AC voltage, power consumed, and output voltage measurements may be provided to the portable device. In some embodiments, serial data exchange may also be used for cable identification and authentication.

Figure 4:
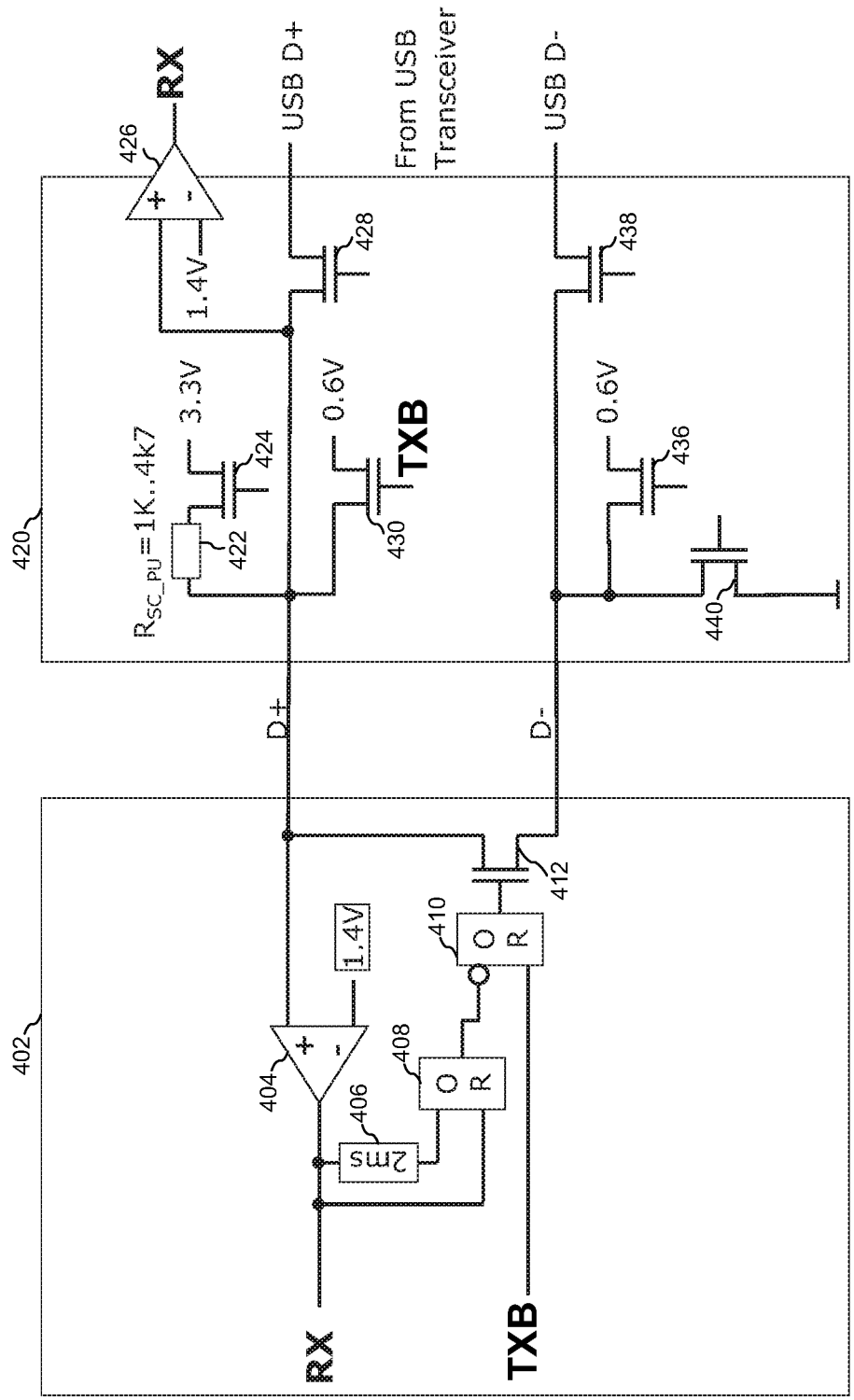
FIG. 4 illustrates interface circuits of an embodiment system.

FIG. 4 illustrates a schematic showing embodiment circuitry within adapter interface 402 and portable device interface 420. In some embodiments adapter interface 402 and portable device interface 420 may be used to implement interface circuits 108 and 114, respectively shown in FIG. 1. Adapter interface 402 includes comparator 404 that functions as a receiver. As shown, the voltage of data line D+ is compared with a 1.4 V threshold voltage to determine a received signal level. The output of comparator 404 receives signal RX, which may be coupled to a controller of the adapter. It should be appreciated that in alternative embodiments, a different threshold level may be used for comparator 404.

Adapter interface 402 also further includes delay circuit 406, OR gates 408 and 410, and transistor 412 coupled to lines D+ and D−. As shown, when D+ is less than the 1.4 V threshold, transistor 412 is on, thereby connecting D+ and D− together, which facilitates primary and secondary detection. When D+ has a voltage of greater than 1.4 V, transistor 412 is quickly turned off, which disconnects D+ from D− during embodiment bi-directional serial communication. Delay circuit 406 prevents transistor 412 from turning back on again during the course of serial communication. However, if the voltage of D+ is less than 1.4 V for more than about 2 ms, the connection between lines D+ and D− is reestablished, whereas communication pulses that bring D+ to be less than 1.4 V for less than 2 ms does not reestablish a connection between D+ and D−. In some embodiments, a permanent connection is established between lines D+ and D− when the voltage of D+ is less than 1.4V for more than about 2 ms. It should be appreciated that the 2 ms delay is just one example of many possible delay values that may be used in embodiment adapter interfaces. In alternative embodiments, different delay values and different threshold values may be used depending on the particular embodiment and its specifications. Moreover, the circuit implementation using comparator 404, delay 406, OR gates 408 and 410 and transistor 412 may be implemented using other circuits.

During data transmission between adapter interface 402 and portable device interface 420, portable device interface 420 couples line D− to 0.6 V via switch transistor 430, and pulls line D+ up to 3.3 V via pullup resistor 422 and switch transistor 424. Adapter interface transmits data by switching transistor 412 on and off in accordance with logic signal TXB, which is a logically inverted version of a transmit serial data bit. It should be understood, however, that in some embodiments, a non-inverted signal may also be used. When transistor 412 is on, D+ is pulled down to 0.6 V via transistor 430, which acts as a pulldown switch, in portable device interface circuit 420, and when transistor 412 is off, D+ is pulled up by pullup resistor 422 and switch transistor 424. Pullup resistor 422 may have a resistance between about 1 kΩ and about 10 Ωk, for example 4.7 Ωk, however, resistance values outside of this range may also be used depending on the particular requirements of the system. The received state of data line D+ is sensed by comparator 426 and compared to 1.4 V in portable device interface circuit 420.

Likewise, portable device interface transmits data by switching transistor 430 on and off in accordance with logic signal TXB, which is a logically inverted version of a transmit serial data bit on the side of the portable device. When transistor 430 is on, D+ is pulled down to 0.6 V, and when transistor 430 is off, D+ is pulled up by pullup resistor 422 and switch transistor 424. The received state of data line D+ is sensed by comparator 404 and compared to 1.4 V in adapter interface circuit 402.

Portable device further includes switch transistor 436 that may be used to pull line D− down to 0.6 V, and switch transistor 440 that may be used to pull line D− to ground. Switching transistors 424, 430, 436 and 440 may be used to provide signaling during primary and secondary detection phases described herein. In some embodiments, switch transistors 428 and 438 couple lines D+ and D− to a USB transceiver (not shown).

Figure 5:
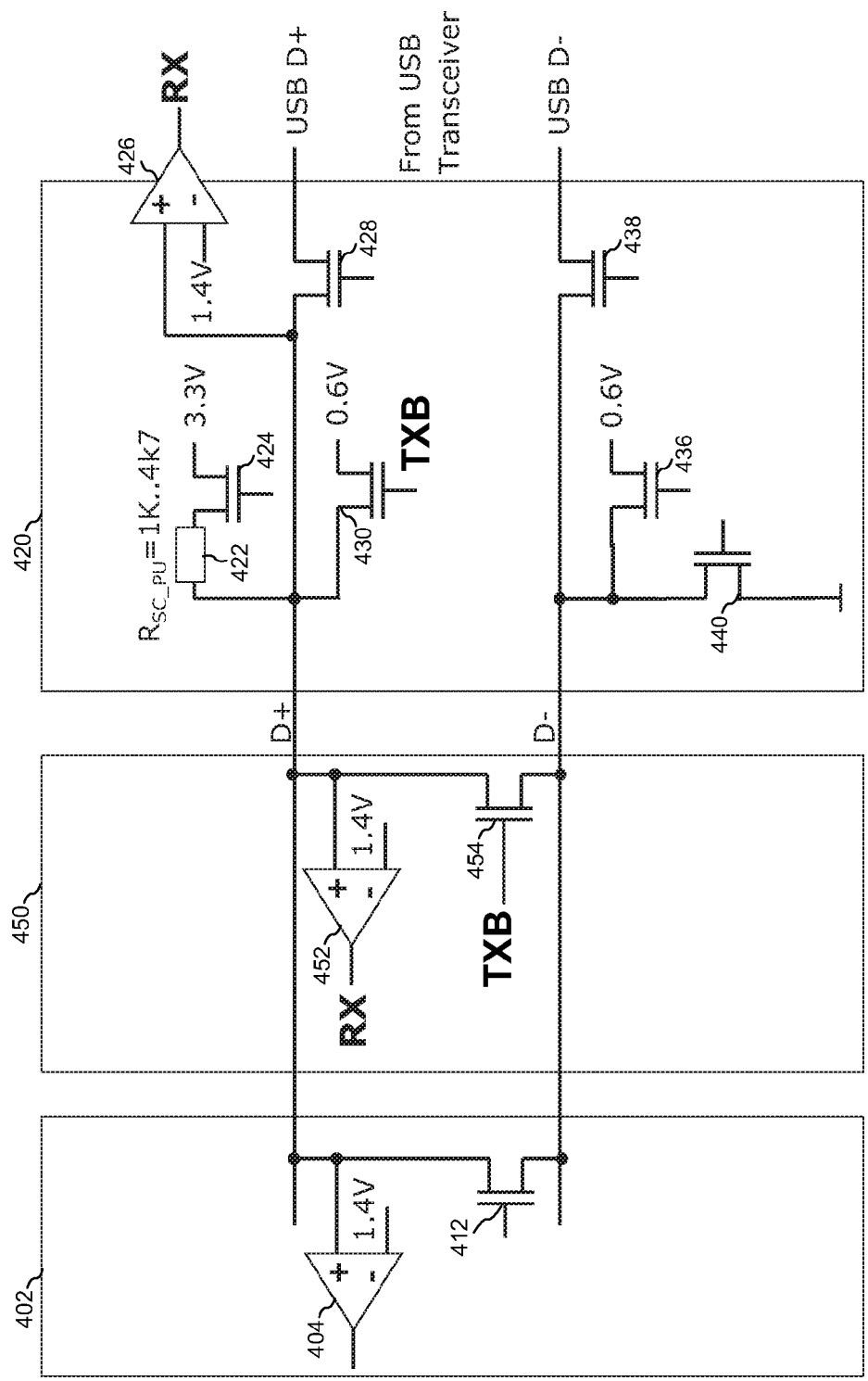
FIG. 5 illustrates interface circuits of a further embodiment system.

FIG. 5 illustrates a system that includes additional interface circuit 450, which may be included in a smart cable that may also be used to communicate with adapter interface circuit 402 and portable device interface 420. Interface circuit 450 transmits by switchably connecting lines D+ and D− together via switch 454 in accordance with signal TXB; when switch transistor 454 is on, line D+ is pulled to 0.6 V via transistor 436 in portable device interface circuit 420; and when switch transistor 454 is off, line D+ is pulled up to 3.3 V via pullup resistor 422 and switch transistor 424. Data is received by comparator 452. In some embodiments, adaptor interface circuit 402 may separately address the user device and smart cable by via different addresses in the transmitted data word.

It should be understood that the voltage levels detailed herein and illustrated in FIGS. 4 and 5 are just two of many possible examples. In alternative embodiments, different voltage levels with respect to both reference voltages and threshold voltages may be used.

Figure 6:
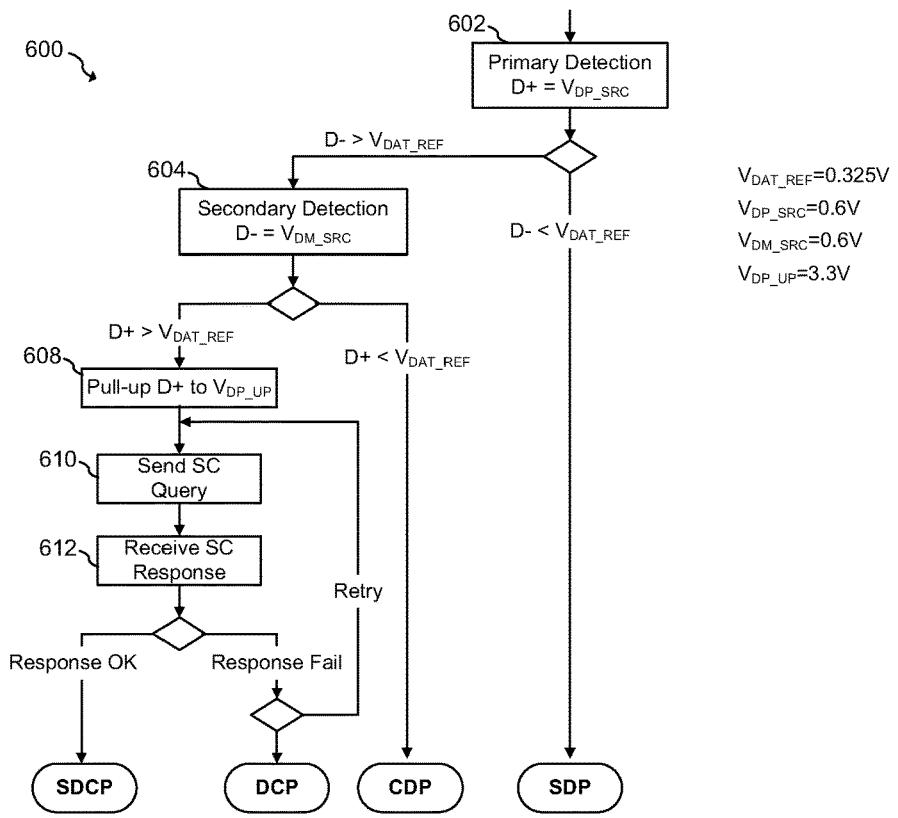
FIG. 6 illustrates a flow chart of an embodiment method.

FIG. 6 illustrates a flowchart 600 of an embodiment method that may be used by a portable device to establish communication with an embodiment adapter. In the illustrated embodiment, a primary detection is initiated by the portable device in step 602 by asserting voltage $V_{DP\_SRC}$ on line D+. If the voltage at line D− is less than $V_{DAT\_REF}$, then the user device determines that the attached device is a SDP. If, on the other hand the voltage at line D− is greater than $V_{DAT\_REF}$, secondary detection is performed in step 604 in which the portable device asserts voltage $V_{DM\_SRC}$ on line D+. If the voltage at line D+ is less than $V_{DAT\_REF}$, then the user device determines that the attached device is a CDP. Otherwise, the device proceeds to determine whether the attached device is capable of embodiment serial communication.

In step 608, the portable device pulls line D+ to voltage $V_{DAT\_REF}$, and then sends a query in step 610 via line D+. If the portable device successfully receives a response back from the adapter in step 612, the user device determines that the connected device is compatible with embodiment serial data communication. Otherwise, the portable device determines that the connected device is a DCP. In some embodiments, the query-response process of steps 610 and 612 may be repeated. In an embodiment, $V_{DAT\_REF}$=0.325V, $V_{DP\_SRC}$=0.6V, $V_{DM\_SRC}$=0.6V and $V_{DP\_UP}$=3.3V. Alternatively, other voltages may be used.

Figure 7:
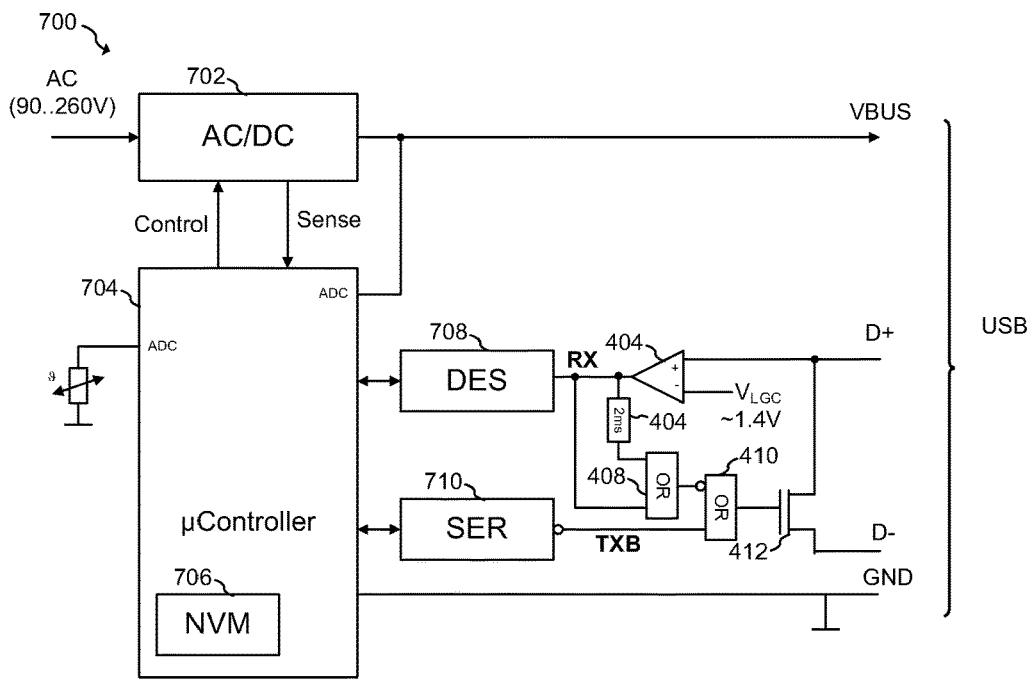
FIG. 7 illustrates a schematic of an embodiment charging circuit.

An embodiment adapter implementation 700 is depicted in FIG. 7. A microcontroller (μC) 704 is used to control communication and detection and AC/DC converter 702 is used to generate a DC supply voltage at VBUS from an AC line voltage. AC/DC converter 702 may be implemented using a switched mode power supply or other power supply architecture known in the art. Microcontroller 704 may control the output voltage of AC/DC converter. In some embodiments, the output voltage may be controlled by generating switching signals based on sensed current and voltage feedback from AC/DC converter 702. A serializer 710 provides inverted transmit signal TXB to OR gate 410 and transistor 412, while de-serializer 708 receives received signal RX from comparator 404. In some embodiments, device related data may be stored in non-volatile memory 706, which may be transmitted to a connected device via the USB interface using embodiment serial data transmission methods.

Figure 8:
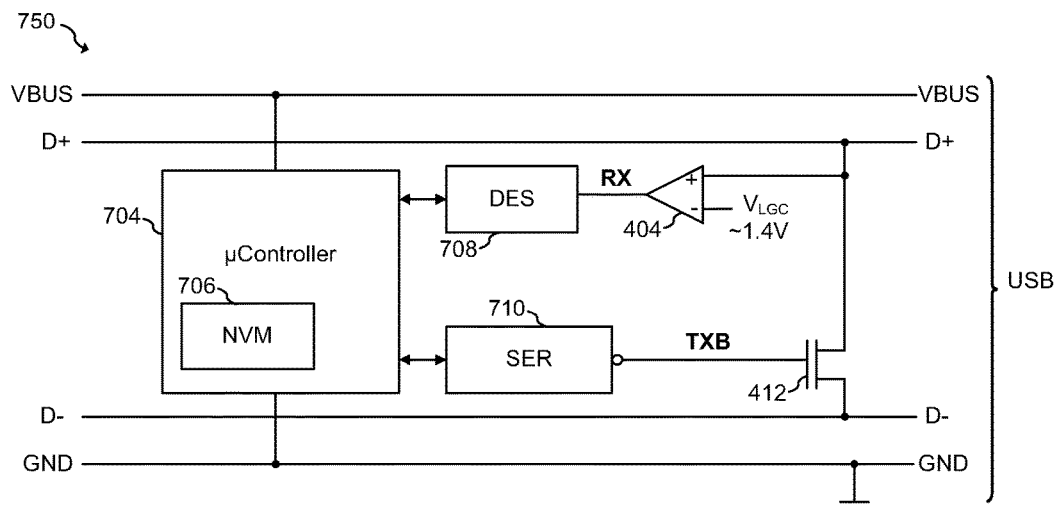
FIG. 8 illustrates a schematic of an embodiment smart cable circuit.

A schematic of an embodiment smart cable circuit 750 is depicted in FIG. 8. In an embodiment, circuit 750 may be disposed within a cable, for example within a portion of a connector. In some embodiments, the cable may be a USB or other cable type. When connected to a portable device, circuit 750 may communicate such parameters as manufacture name, serial number, cable type, current handling capability, voltage handling capability, as well as other parameters using embodiment communication systems and methods described herein. In some embodiments, circuit 750 may provide cryptographic authentication by provided a cryptographic key and/or cryptographic responses to a portable of other device coupled to D+ and D−.

Similar to the adapter implementation of FIG. 7, microcontroller (μC) 704 is used to control communication and detection using embodiment methods. Serializer 710 provides inverted transmit signal TXB to transistor 412, and de-serializer 708 receives received signal RX from comparator 404. In some embodiments, device related data may be stored in non-volatile memory 706, which may be transmitted to a connected device via the USB interface using embodiment serial data transmission methods.

In accordance with an embodiment, a method of operating a charging port having a power connection and a first data connection includes determining whether a compatible device is coupled to the charging port and receiving a serial data stream from the compatible device via the first data connection. The serial data stream includes a plurality of symbols representing a request for a power supply voltage and/or current, and the method further includes applying the requested power supply voltage and/or current to the power connection.

In an embodiment, the charging port further includes a second data connection, the serial data stream from the compatible device comprises a pseudo-differential transmission referenced to the second data connection. Receiving the serial data stream may further include receiving a time-distance modulated data stream. Moreover, determining whether the compatible device is coupled to the charging port may include determining whether a voltage of the first data connection is greater than a first threshold, monitoring the first data connection for a query after the voltage of the first data connection is determined to be greater than the first threshold, and determining that the compatible device is coupled to the charging port if the query is received.

The method may further include transmitting a response to the compatible device via the first data connection and/or transmitting further data to the compatible device on the first data connection. In an embodiment, the response or the further data includes at least one of product number, product name, serial number, version numbers, power rating, voltage supply capabilities, current supply capabilities, temperature, power consumption, AC input voltage, DC output voltage, cryptographic keys and cryptographic challenges or responses.

In an embodiment, the compatible device includes a universal serial bus (USB) device and determining whether the compatible device is coupled to the charging port comprises performing a primary detection phase and a secondary detection phase.

In accordance with a further embodiment, a method of operating a device coupled to a charging port via a power connection and a first data connection includes establishing a data connection with the charging port, and transmitting a serial data stream via the first data connection. The serial data stream includes a plurality of symbols representing a request for a power supply voltage and/or current, and the method further includes receiving the requested power supply voltage and/or current from the charging port via the power connection. Establishing the data connection may include asserting a first voltage on the first data connection, sending a query on the first data connection, and receiving a response from the charging port. The query includes the request for the power supply voltage and/or current in some embodiments. Moreover, transmitting the serial data stream may include transmitting a time-distance modulated data stream. The method may further include transmitting further data to the charging port on the first data connection.

In some embodiments, the device includes a universal serial bus (USB) device and the device is further coupled to the charging port via a second data connection. Establishing the data connection includes asserting a first voltage on the first data connection, determining whether a voltage of the second data connection is greater than a first threshold after asserting the first voltage, asserting a second voltage on the second data connection if the voltage of the second data connection is greater than the first threshold, determining whether a voltage of the first data connection is greater than the first threshold after asserting the second voltage, asserting a third voltage on the first data connection, sending a query on the first data connection after asserting the third voltage, determining that the data connection is established when if a response to the query is received on the first data connection.

In an embodiment, transmitting the serial data stream includes pulling up the first data connection to a third voltage using a resistor and coupling the first data connection to a fourth voltage using a switching transistor when a symbol of the serial data stream is in a first state.

In accordance with a further embodiment, a charging port circuit includes a line interface circuit having a first data line connection configured to be coupled to a first data line of an interface bus, and configured to receive a serial data stream at the first data line connection. The serial data stream may include a plurality of symbols representing a request for a power supply voltage and/or current. The charging port circuit may further include a controller circuit coupled to the interface circuit and configured to be coupled to an adjustable power supply. The controller circuit may be configured to determine whether a compatible device is coupled to the interface bus, and adjust the adjustable power supply to provide the requested power supply voltage to a power line of the interface bus.

In an embodiment, the line interface circuit includes a receiver circuit configured to measure a voltage at the first data line connection, wherein the receiver comprises an output coupled to the controller. The receiver may include a switch coupled between the first data line connection and a second data line connection configured to be coupled to a second data line of the interface bus. In addition, the controller is further configured to transmit data on the first data line connection by changing a state of a switch coupled between the first data line connection and the second data line connection.

In some embodiments, the receiver includes a comparator. The charging port may further includes a switch coupled between the first data line connection and a second data line connection configured to be coupled to a second data line of the interface bus. In some embodiments, the controller may be configured to determine whether a voltage of the first data connection is greater than a first threshold, and monitor the first data connection for a query after a voltage of the first data connection is determined to be greater than the first threshold.

In an embodiment, the compatible device may be a USB device. In some embodiments, the charging port may include the adjustable power supply.

In accordance with a further embodiment, a system includes a bus interface circuit having a first data line terminal and a power terminal, wherein the bus interface circuit is configured to be coupled to a charging port. The system further includes a controller coupled to the bus interface circuit, wherein the controller is configured to establish a data connection with the charging port via the bus interface circuit, and transmit a serial data stream via the first data line terminal to the charging port, wherein the serial data stream comprises a plurality of symbols representing a request for a power supply voltage and/or current. The controller is further configured to receive the requested power supply voltage and/or current from the charging port via the power terminal.

In an embodiment, the bus interface circuit includes a receiver circuit configured to measure a voltage at the first data line terminal, and the receiver comprises an output coupled to the controller. The controller may be configured to assert a first voltage on the first data line terminal, determine whether a voltage of a second data terminal line of the bus interface circuit is greater than a first threshold after asserting the first voltage based on the output of the receiver circuit, assert a second voltage on the second data line terminal if the voltage of the second data line terminal is greater than the first threshold, determine whether a voltage of the first data line terminal is greater than the first threshold after asserting the second voltage based on the output of the receiver circuit, assert a third voltage on the first data line terminal, send a query on the first data line terminal after asserting the third voltage, and determine that the data connection is established when if a response to the query is received on the first data line terminal.

In an embodiment, the bus interface circuit includes a first switchable pullup resistance or current source coupled between the first data line terminal and a first reference voltage, a first pulldown switch coupled between the first data line terminal and a second reference voltage, and a second pulldown switch coupled the second data line terminal and the second reference voltage. The bus interface circuit may also include a comparator having an input coupled to the first data line terminal. The controller may be configured to send a query by switching the first pulldown switch according to query data.

In an embodiment, a universal serial bus (USB) transceiver coupled to the first data terminal and to a second data line terminal of the bus interface circuit. In some embodiments, the bus interface circuit further includes a second data line terminal and the serial data stream is transmitted via the first data line terminal using the second data line terminal as a reference.

In accordance with a further embodiment, a smart cable circuit includes a line interface circuit having a first data line connection configured to be coupled to a first data line of an interface bus, a second data line connection configured to be coupled to a second data line of the interface bus, a power line connection configured to be coupled to a power connection of the interface bus, and a ground connection configured to be coupled to a ground connection of the interface bus, wherein the interface bus is a Universal Serial Bus (USB). The smart cable circuit further includes a controller circuit coupled to the interface circuit and configured to determine whether a compatible device is coupled to the interface bus via the first data line connection, and transmit a serial data stream comprising a plurality of symbols at the first data line connection using pseudo-differential signaling referenced to the second data line connection.

In an embodiment, the serial data stream includes at least one of product number, product name, serial number, version numbers, power rating, voltage supply capabilities, current supply capabilities, temperature, power consumption, AC input voltage, DC output voltage, cryptographic keys and a cryptographic key, cryptographic challenge, and cryptographic response.

Advantages of embodiments of the present invention include the ability to quickly charge a battery coupled to a connected USB device, and, in some case, maintain compatibility with other USB devices. Other advantages include identification of the adapter, (e.g. manufacturer, product number, product name, version number, voltage supply capability, AC input voltage, DC output voltage, serial number), mutual cryptographic authentication between adapter and PD as well as telemetry of operation parameters from adapter to PD.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a charging port having a power connection and a first data connection, the method comprising:
   determining whether a compatible device is coupled to the charging port, wherein determining whether the compatible device is coupled to the charging port comprises determining whether a voltage of the first data connection is greater than a first threshold, monitoring the first data connection for a query after the voltage of the first data connection is determined to be greater than the first threshold, and determining that the compatible device is coupled to the charging port if the query is received on the first connection, wherein the query comprises a first serial data stream that comprises a plurality of consecutive symbols;
   receiving a second serial data stream from the compatible device via the first data connection, wherein the second serial data stream comprises a plurality of symbols representing a request for a power supply voltage and/or current, and the first data connection is separate from the power connection; and
   applying the requested power supply voltage and/or current to the power connection.

2. The method of claim 1, wherein:
   the charging port further comprises a second data connection; and
   the second serial data stream from the compatible device comprises a pseudo-differential transmission referenced to the second data connection.

3. The method of claim 1, wherein receiving the second serial data stream comprises receiving a time-distance modulated data stream.

4. The method of claim 1, further comprising transmitting a response to the compatible device via the first data connection.

5. The method of claim 4, further comprising transmitting further data to the compatible device on the first data connection.

6. The method of claim 5, wherein the response or the further data comprises at least one of product number, product name, serial number, version numbers, power rating, voltage supply capabilities, current supply capabilities, temperature, power consumption, AC input voltage, DC output voltage, cryptographic keys and cryptographic challenges or responses.

7. The method of claim 1, wherein:
   the compatible device comprises a universal serial bus (USB) device; and
   determining whether the compatible device is coupled to the charging port comprises performing a primary detection phase and a secondary detection phase.

8. The method of claim 1, wherein determining whether the compatible device is coupled to the charging port comprises:
   determining whether a voltage of a second data connection of the charging port is greater than a first threshold after determining that the voltage of the first data connection is greater than the first threshold;
   asserting a second voltage on the first data connection if the voltage of the second data connection is greater than the first threshold;
   determining whether a voltage of the second data connection is greater than the first threshold after asserting the second voltage; and
   performing the monitoring of the first data connection for the query after determining whether the voltage of the second data connection is greater than the first threshold after asserting the second voltage.

9. A method of operating a device coupled to a charging port via a power connection and a first data connection, the method comprising:
   establishing a data connection with the charging port, wherein establishing the data connection comprises asserting a first voltage on the first data connection, sending a query on the first data connection, and receiving a response from the charging port, wherein the query comprises a first serial data stream that comprises a plurality of consecutive symbols;
   transmitting a second serial data stream via the first data connection, wherein the second serial data stream comprises a plurality of symbols representing a request for a power supply voltage and/or current, and the first data connection is separate from the power connection; and
   receiving the requested power supply voltage and/or current from the charging port via the power connection.

10. The method of claim 9, wherein the query comprises the request for the power supply voltage and/or current.

11. The method of claim 9, wherein transmitting the second serial data stream comprises transmitting a time-distance modulated data stream.

12. The method of claim 9, wherein the device comprises a universal serial bus (USB) device and is further coupled to the charging port via a second data connection and establishing the data connection comprises:
   determining whether a voltage of the second data connection is greater than a first threshold after asserting the first voltage;
   asserting a second voltage on the second data connection if the voltage of the second data connection is greater than the first threshold;
   determining whether a voltage of the first data connection is greater than the first threshold after asserting the second voltage;
   asserting a third voltage on the first data connection;
   sending the query on the first data connection comprises sending the query after asserting the third voltage; and
   determining that the data connection is established when the response to the query is received on the first data connection.

13. The method of claim 9, further comprising transmitting further data to the charging port on the first data connection.

14. The method of claim 9, wherein transmitting the second serial data stream comprises;
  pulling up the first data connection to a third voltage using a resistor; and
  coupling the first data connection to a fourth voltage using a switching transistor when a symbol of the second serial data stream is in a first state.

15. A charging port circuit comprising:
  a line interface circuit comprising a first data line connection configured to be coupled to a first data line of an interface bus, and configured to receive a first serial data stream at the first data line connection, wherein the first serial data stream comprises a plurality of symbols representing a request for a power supply voltage and/or current; and
  a controller circuit coupled to the line interface circuit and configured to be coupled to an adjustable power supply, wherein the controller circuit is configured to:
    determine whether a compatible device is coupled to the interface bus by determining whether a voltage of the first data line connection is greater than a first threshold, and monitoring the first data line connection for a query after a voltage of the first data line connection is determined to be greater than the first threshold, wherein the query comprises a second serial data stream that comprises a plurality of consecutive symbols; and
    adjust the adjustable power supply to provide the requested power supply voltage to a power line of the interface bus separate from the first data line of the interface bus.

16. The charging port circuit of claim 15, wherein the line interface circuit comprises a receiver circuit configured to measure a voltage at the first data line connection, wherein the receiver circuit comprises an output coupled to the controller circuit.

17. The charging port circuit of claim 16, wherein:
  the receiver circuit comprises a switch coupled between the first data line connection and a second data line connection configured to be coupled to a second data line of the interface bus; and
  the controller circuit is further configured to transmit data on the first data line connection by changing a state of a switch coupled between the first data line connection and the second data line connection.

18. The charging port circuit of claim 16, wherein the receiver circuit comprises a comparator.

19. The charging port circuit of claim 18, further comprising a switch coupled between the first data line connection and a second data line connection configured to be coupled to a second data line of the interface bus.

20. The charging port circuit of claim 15, further comprising the adjustable power supply.

21. The charging port circuit of claim 15, wherein the compatible device is configured to:
  determine whether a voltage of a second data line connection of the interface bus is greater than a first threshold after determining that the voltage of the first data line connection is greater than the first threshold;
  assert a second voltage on the first data line connection if the voltage of the second data line connection is greater than the first threshold;
  determine whether a voltage of the second data connection line is greater than the first threshold after asserting the second voltage; and
  performing the monitoring of the first data line connection for the query after determining whether the voltage of the second data line connection is greater than the first threshold after asserting the second voltage.

22. A system comprising:
  a bus interface circuit comprising a first data line terminal and a power terminal separate from the first data line terminal, and a receiver circuit configured to measure a voltage at the first data line terminal, wherein the bus interface circuit is configured to be coupled to a charging port;
  a controller coupled to the bus interface circuit and an output of the receiver circuit, wherein the controller is configured to
    establish a data connection with the charging port via the bus interface circuit by
      asserting a first voltage on the first data line terminal,
      sending a query on the first data line terminal, wherein the query comprises a first serial data stream that comprises a plurality of consecutive symbols, and
      determining that the data connection is established when a response to the query is received on the first data line terminal;
    transmit a second serial data stream via the first data line terminal to the charging port, wherein the second serial data stream comprises a plurality of symbols representing a request for a power supply voltage and/or current; and
    receive the requested power supply voltage and/or current from the charging port via the power terminal.

23. The system of claim 22, wherein the controller is further configured to establish the data connection with the charging port by:
  determining whether a voltage of a second data terminal line of the bus interface circuit is greater than a first threshold after asserting the first voltage based on the output of the receiver circuit;
  asserting a second voltage on the second data line terminal if the voltage of the second data line terminal is greater than the first threshold;
  determining whether a voltage of the first data line terminal is greater than the first threshold after asserting the second voltage based on the output of the receiver circuit;
  asserting a third voltage on the first data line terminal; and
  sending the query on the first data line terminal comprises sending the query on the first data line terminal after asserting the third voltage.

24. The system of claim 22, wherein the bus interface circuit comprises:
  a first switchable pullup resistance or current source coupled between the first data line terminal and a first reference voltage;
  a first pulldown switch coupled between the first data line terminal and a second reference voltage; and
  a second pulldown switch coupled between a second data line terminal of the bus interface circuit and the second reference voltage.

25. The system of claim 24, further comprising a comparator having an input coupled to the first data line terminal.

26. The system of claim 24, wherein the controller is configured to send the query by switching the first pulldown switch according to query data.

27. The system of claim 22, further comprising a universal serial bus (USB) transceiver coupled to the first data line terminal and to a second data line terminal of the bus interface circuit.

28. The system of claim 22, wherein:
the bus interface circuit further comprises a second data line terminal; and
the second serial data stream is transmitted via the first data line terminal using the second data line terminal as a reference.

29. A smart cable circuit comprising:
a line interface circuit comprising a first data line connection configured to be coupled to a first data line of an interface bus, a second data line connection configured to be coupled to a second data line of the interface bus, a power line connection configured to be coupled to a power connection of the interface bus, and a ground connection configured to be coupled to a ground connection of the interface bus, wherein the interface bus is a Universal Serial Bus (USB), wherein the first data line of the interface bus, the second data line of the interface bus and the power connection of the interface bus are separate from each other; and
a controller circuit coupled to the line interface circuit and configured to:
determine whether a compatible device is coupled to the interface bus via the first data line connection by asserting a first voltage on the first data line connection, sending a query on the first data line connection, and determining that a data communication is established when a response to the query is received on the first data line connection, wherein the query comprises a first serial data stream that comprises a plurality of consecutive symbols, and
transmit a second serial data stream comprising a plurality of symbols at the first data line connection using pseudo-differential signaling referenced to the second data line connection.

30. The circuit of claim 29, wherein the second serial data stream comprises at least one of product number, product name, serial number, version numbers, power rating, voltage supply capabilities, current supply capabilities, temperature, power consumption, AC input voltage, DC output voltage, cryptographic keys and a cryptographic key, cryptographic challenge, and cryptographic response.

31. The circuit of claim 29, wherein the controller circuit is further configured to establish the data communication with a charging port via first data connection by
determining whether a voltage of the second data line connection is greater than a first threshold after asserting the first voltage;
asserting a second voltage on the second data line connection if the voltage of the second data line connection is greater than the first threshold;
determining whether a voltage of the first data line connection is greater than the first threshold after asserting the second voltage;
asserting a third voltage on the first data line connection; and
sending the query on the first data line connection is performed after asserting the third voltage.

* * * * *